No. 704,614. Patented July 15, 1902.
A. S. CAPPER.
BEET CULTURE IMPLEMENT.
(Application filed Apr. 28, 1902.)
(No Model.)
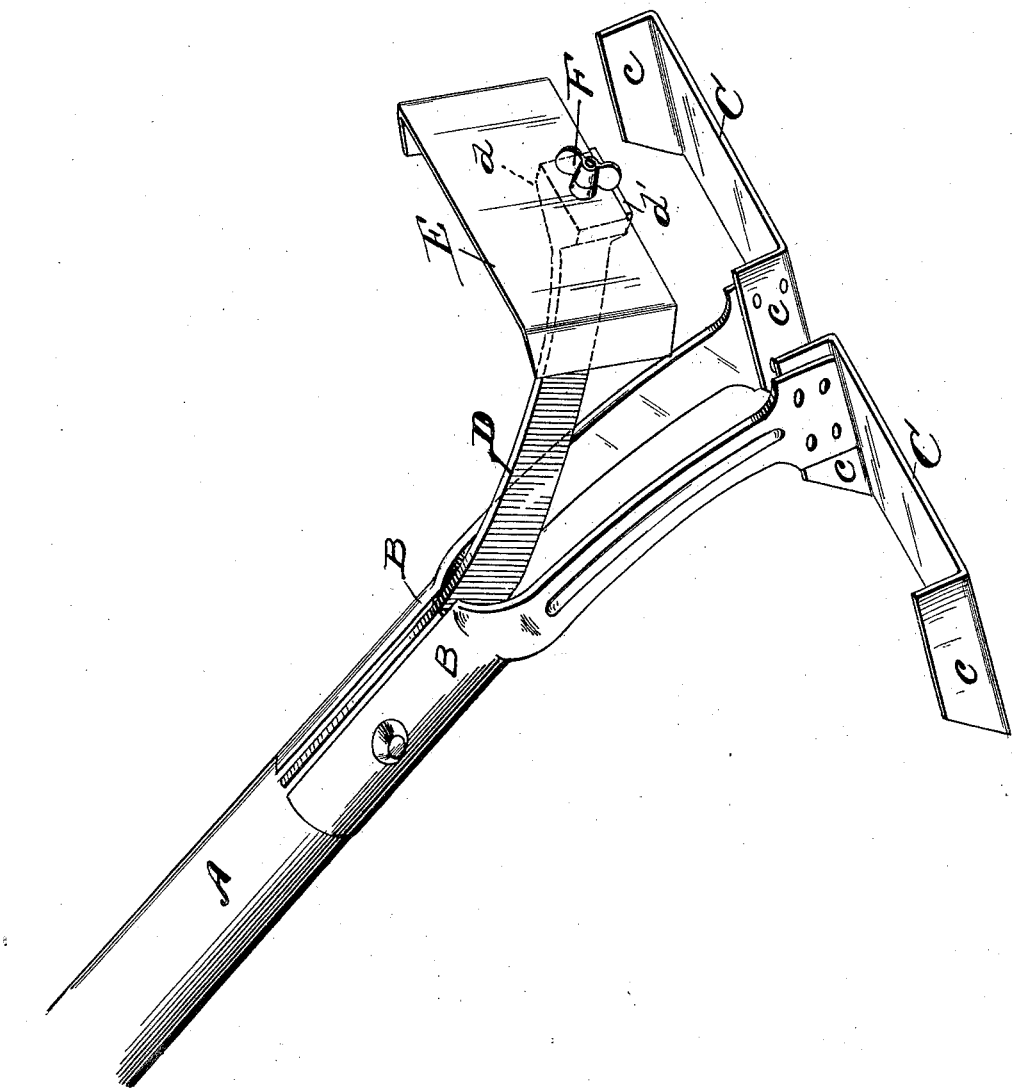

UNITED STATES PATENT OFFICE.

ARTHUR S. CAPPER, OF DETROIT, MICHIGAN.

BEET-CULTURE IMPLEMENT.

SPECIFICATION forming part of Letters Patent No. 704,614, dated July 15, 1902.

Application filed April 28, 1902. Serial No. 104,960. (No model.)

*To all whom it may concern:*

Be it known that I, ARTHUR S. CAPPER, a citizen of the United States, residing at Detroit, county of Wayne, State of Michigan, have invented a certain new and useful Improvement in Beet-Culture Implements; and I declare the following to be a full, clear, and exact description of the invention, such as will enable others skilled in the art to which it pertains to make and use the same, reference being had to the accompanying drawing, which forms a part of this specification.

My invention relates to an improvement in implements designed especially for use in beet-culture.

The drawing shows a perspective view of my improved weeding implement.

The object of this invention is to provide a combination implement adapted to the requirements of beet culture, particularly when the plants are small.

It consists in providing a combination implement so constructed that the operator can work on both sides and close to the plant without injury to it and in providing means whereby any tool, such as a rake or single hoe, may be attached for special use.

Referring to the letters of reference shown in the drawing, A represents the handle; B, the shanks bolted to the handle and to the forked ends of which are secured the hoes C. The hoes C are provided with the flanges $c$, designed to protect the young plant from injury while working around it. The forked ends of the shanks B are spread apart sufficiently to allow the hoes to straddle the young plant and permit the operator to work on both sides of it.

D is a shank set in a kerf cut in the handle A and held by the same bolt that engages the shanks B. This shank I prefer to curve in an opposite direction to that given to the shanks B.

$d$ is a shoulder formed on the forward end of the shank D and integral therewith, and $d'$ is a flange on its lower edge.

E is a removable tool, which may be an ordinary hoe and of a width equal to the combined length of the hoes C, or it may be a rake or other implement.

F is a set-screw to engage the removable tool E to the shank, and when the tool is in position it is held against rotation by the flange $d'$.

Having thus described my invention, what I claim is—

A weeding implement consisting of a pair of hoes in line with but separated from each other, and a shank designed to support a removable tool, a shoulder on the forward end of the shank, a flange $d'$ on said shoulder and a set-screw F to engage the removable tool to the shank, substantially as described.

In testimony whereof I sign this specification in the presence of two witnesses.

ARTHUR S. CAPPER.

Witnesses:
 S. E. THOMAS,
 HENRY E. VILLEROT.